(12) United States Patent
Cheng et al.

(10) Patent No.: US 10,002,574 B2
(45) Date of Patent: Jun. 19, 2018

(54) METHOD, APPARATUS FOR DISPLAY COMPENSATION AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Peng Cheng, Beijing (CN); Shuhuan Yu, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 15/027,103

(22) PCT Filed: Jul. 28, 2015

(86) PCT No.: PCT/CN2015/085304
§ 371 (c)(1),
(2) Date: Apr. 4, 2016

(87) PCT Pub. No.: WO2016/127591
PCT Pub. Date: Aug. 18, 2016

(65) Prior Publication Data
US 2016/0360192 A1 Dec. 8, 2016

(30) Foreign Application Priority Data

Feb. 15, 2015 (CN) .......................... 2015 1 0082424

(51) Int. Cl.
*G09G 3/34* (2006.01)
*H04N 13/04* (2006.01)
*G09G 3/00* (2006.01)

(52) U.S. Cl.
CPC ............. *G09G 3/342* (2013.01); *G09G 3/003* (2013.01); *G09G 3/3413* (2013.01);
(Continued)

(58) Field of Classification Search
CPC ................................. G09G 2320/0233; G09G 2320/0626–2320/0653; H04N 13/0025
See application file for complete search history.

(56) References Cited

U.S. PATENT DOCUMENTS 7,717,601 B2 * 5/2010 Tan ..................... G02F 1/13318
362/240
7,830,355 B2 * 11/2010 Hirakata ................ G09G 3/342
345/102

(Continued)

FOREIGN PATENT DOCUMENTS

CN 1864089 A 11/2006
CN 1908748 A 2/2007

(Continued)

OTHER PUBLICATIONS

International Search Report and Written Opinion dated Nov. 20, 2015; PCT/CN2015/085304.

*Primary Examiner* — Patrick F Marinelli
(74) *Attorney, Agent, or Firm* — Ladas & Parry LLP

(57) ABSTRACT

A display compensation method is applied to a shutter 3D display device including a display panel and a backlight module, wherein the backlight module includes a first light source and a second light source, the display panel includes a plurality of first display regions, the backlight module includes a plurality of first backlight regions corresponding to the plurality of first display regions respectively; the display compensation method includes: turning on the first light source of the first backlight region; acquiring the brightness of the backlight module under a condition that the first light source is turned on; determining whether the
(Continued)

brightness is within a preset brightness range; turning on the second light source of the first backlight region if the brightness is within the preset brightness range, so as to perform a display brightness compensation for a displaying picture.

16 Claims, 9 Drawing Sheets

(52) U.S. Cl.
CPC ..... *H04N 13/0418* (2013.01); *H04N 13/0422* (2013.01); *H04N 13/0438* (2013.01); *H04N 13/0497* (2013.01); *G09G 2320/0209* (2013.01); *G09G 2320/0233* (2013.01); *G09G 2320/0242* (2013.01); *G09G 2320/0626* (2013.01)

(56) References Cited

U.S. PATENT DOCUMENTS

| | | | | |
|---|---|---|---|---|
| 8,330,708 B2* | 12/2012 | Park | ................. | G02F 1/133603 345/102 |
| 8,704,749 B2* | 4/2014 | Jun | ..................... | G09G 3/3406 345/102 |
| 8,902,264 B2* | 12/2014 | Oh | ..................... | H04N 13/0438 345/691 |
| 9,325,976 B2* | 4/2016 | Atkins | ................... | G09G 3/003 |
| 9,412,313 B2* | 8/2016 | Oh | ..................... | H04N 13/0438 |
| 9,667,929 B2* | 5/2017 | Yang | ..................... | H04N 9/3182 |
| 2006/0038771 A1* | 2/2006 | Hirakata | ................ | G09G 3/342 345/102 |
| 2007/0030697 A1 | 2/2007 | Kim | | |
| 2007/0040778 A1 | 2/2007 | Karman et al. | | |
| 2007/0182697 A1* | 8/2007 | Chang | ................ | H05B 41/2824 345/102 |
| 2007/0229448 A1* | 10/2007 | Lin | ..................... | G09G 3/3406 345/102 |
| 2008/0258632 A1* | 10/2008 | Lee | ..................... | G09G 3/3413 315/153 |
| 2008/0266897 A1* | 10/2008 | Shikii | ................... | G02B 6/003 362/606 |
| 2009/0086473 A1* | 4/2009 | Tan | ..................... | G02F 1/13318 345/102 |
| 2009/0224678 A1 | 9/2009 | Wang | | |
| 2010/0177501 A1* | 7/2010 | Lin | ................... | G02F 1/133603 362/97.3 |
| 2010/0253678 A1* | 10/2010 | Choi | ................. | H04N 13/0438 345/419 |
| 2010/0302268 A1* | 12/2010 | Jun | ..................... | G09G 3/3406 345/589 |
| 2011/0050668 A1* | 3/2011 | Park | ..................... | G09G 3/3426 345/211 |
| 2011/0050743 A1* | 3/2011 | Park | ................. | G02F 1/133603 345/690 |
| 2012/0120128 A1* | 5/2012 | Oh | ..................... | H04N 13/0438 345/691 |
| 2012/0281026 A1* | 11/2012 | Atkins | ................... | G09G 3/003 345/690 |
| 2013/0016141 A1* | 1/2013 | Chang | ................. | G09G 3/3426 345/691 |
| 2013/0265346 A1* | 10/2013 | Yu | ......................... | G09G 3/3426 345/691 |
| 2014/0240341 A1* | 8/2014 | Oda | ........................ | G09G 5/02 345/590 |
| 2015/0049131 A1* | 2/2015 | Oh | ..................... | H04N 13/0438 345/690 |
| 2016/0063927 A1* | 3/2016 | Li | ......................... | G09G 3/3406 315/297 |
| 2016/0112690 A1* | 4/2016 | Yang | ..................... | H04N 9/3182 345/690 |
| 2016/0125622 A1* | 5/2016 | Kim | ..................... | H04N 5/202 345/690 |
| 2016/0253968 A1 | 9/2016 | Fu et al. | | |
| 2016/0360192 A1* | 12/2016 | Cheng | ................. | G09G 3/3413 |

FOREIGN PATENT DOCUMENTS

| | | | |
|---|---|---|---|
| CN | 101261388 A | 9/2008 | |
| CN | 103118264 A | 5/2013 | |
| CN | 104157262 A | 11/2014 | |
| CN | 104575439 A | 4/2015 | |
| EP | 1967874 A1 | 9/2008 | |
| JP | 2002311503 A | * 10/2002 | ............... H04N 9/73 |
| WO | 2016/008186 A1 | 1/2016 | |

* cited by examiner

METHOD, APPARATUS FOR DISPLAY COMPENSATION AND DISPLAY DEVICE

TECHNICAL FIELD OF THE DISCLOSURE

The present disclosure relates to the field of display technology, and in particular to a method and apparatus for display compensation and a display device.

BACKGROUND

Today, 3D display technology has been applied widely in the field of display technology, especially in the field of 3D liquid crystal TV. Technology to realize 3D display mainly includes Anaglyphic 3D display technology, Polarized 3D display technology and shutter 3D display technology. Among others, the shutter 3D display technology is applied more widely.

In the field of 3D liquid crystal TV, a viewer needs to wear a pair of shutter 3D glasses to view a 3D picture on a shutter 3D liquid crystal TV. In general, a shutter 3D liquid crystal TV mainly includes components such as a liquid crystal display screen, a backlight module providing a light source for the liquid crystal display screen, etc. The principle for the 3D liquid crystal TV to realize 3D display is as follows. An image is divided into two pictures corresponding to the left eye and the right eye respectively. The right lens of the pair of the shutter 3D glasses is opened and the left lens thereof is closed when a right eye picture is displayed on the TV, and the left lens is opened and the right lens is closed when a left eye picture is displayed. Then, corresponding images can be seen by the left eye and the right eye of the viewer in alternative. In this way, there is a certain parallax between an image for the left eye and that for the right eye of the viewer, and the brain synthesizes the image for left eye and that for the right eye having the parallax, which produces depth perception, that is, a display effect of a stereo image is created.

SUMMARY

Embodiments of the present disclosure provide a method and apparatus for display compensation, and display device, which can solve the problem that the display picture brightness of a shutter 3D liquid crystal display device is decreased in a case in which a backlight partition scan mode is employed.

Accordingly, embodiments of the present disclosure employ technical solutions as follows.

In a first aspect, an embodiment of the present disclosure provides a display compensation method applied to a shutter 3D display device comprising a display panel and a backlight module, wherein the backlight module comprises a first light source and a second light source, the display panel comprises a plurality of first display regions, the backlight module comprises a plurality of first backlight regions corresponding to the plurality of first display regions respectively, and the plurality of first backlight regions of the backlight module are turned on in sequence; wherein the display compensation method comprises: turning on the first light source of the first backlight region; acquiring the brightness from the backlight module under a condition that the first light source is turned on; determining whether the brightness is within a preset brightness range; turning on the second light source of the first backlight region if the brightness is within the preset brightness range, so as to perform the display brightness compensation for a display picture.

Optionally, the method further comprises: acquiring the brightness generated by the backlight module under a condition that the first light source and the second light source are turned on; determining whether the brightness is within the preset brightness range; adjusting the brightness of the second light source if the brightness is within the preset brightness range.

Optionally, the second light source is a monochromatic light source, and the method further comprises: acquiring the color proportion of the same color as the color emitted by the second light source in the first display region corresponding to the first backlight region; determining whether the color proportion of the color is within a preset color proportion range; if the color proportion is within the preset color proportion range, turning on the second light source of the first backlight region if the second light source is not turned on so as to perform the color compensation for the display picture, or adjusting the brightness of the second light source of the first backlight region if the second light source has been turned on so as to perform the color compensation for the display picture.

Optionally, said acquiring the color proportion of the same color as the color emitted by the second light source in the first display region corresponding to the first backlight region comprises: acquiring the gray levels of respective pixels in one frame of display image; determining the gray levels of respective pixels of the first display region corresponding to the first backlight region; determining the color proportion of the same color as the color emitted by the second light source in the first display region according to the gray levels of respective pixels of the first display region.

Optionally, the first display region comprises a plurality of first display sub-regions, and the backlight module comprises a plurality of first backlight sub-regions corresponding to the plurality of first display sub-regions respectively; said acquiring the color proportion of the same color as the color emitted by the second light source in the first display region corresponding to the first backlight region specifically includes: acquiring the color proportion of the same color as the color emitted by the second light source in the first display sub-region corresponding to the first backlight sub-region; in a case in which the color proportion is within the preset color proportion range, said turning on the second light source of the first backlight region if the second light source is not turned on, or said adjusting the brightness of the second light source of the first backlight region if the second light source has been turned on, comprises: turning on the second light source of the first backlight sub-region is turned on if the second light source is not turned on, or adjusting the brightness of the second light source of the first backlight sub-region if the second light source has been turned on.

Optionally, the second light source is a monochromatic light source.

Optionally, the first light source is a LED light source and the second light source is a laser light source.

An embodiment of the present disclosure provides a display compensation apparatus applied to a shutter 3D display device comprising a display panel and a backlight module, wherein the backlight module comprises a first light source and a second light source, the display panel comprises a plurality of first display regions, the backlight module comprises a plurality of first backlight regions corresponding to the plurality of first display regions respectively, and the plurality of first backlight regions of the backlight module are turned on in sequence, the display compensation apparatus comprising: a first switch unit for turning on the first light source of the first backlight region; a first acquisition unit for acquiring the brightness generated by the backlight module under a condition that the first light source is turned on; a first judgment unit for judging whether the brightness is within a preset brightness range; a first compensation unit for turning on the second light source of the first backlight region in a case in which the brightness is within the preset brightness range so as to perform the display brightness compensation for a display picture.

Optionally, the display compensation apparatus further comprises: a second acquisition unit for acquiring the brightness generated by the backlight module under a condition that the first light source and the second light source are turned on; a second judgment unit for judging whether the brightness is within the preset brightness range; a second compensation unit for adjusting the brightness of the second light source if the brightness is within the preset brightness range.

Optionally, the second light source is a monochromatic light source, and the apparatus further comprises: a third acquisition unit for acquiring the color proportion of the same color as the color emitted by the second light source in the first display region corresponding to the first backlight region; a third judgment unit for judging whether the color proportion of the color is within a preset color proportion range; a third compensation unit for, if the color proportion is within the preset color proportion range, turning on the second light source of the first backlight region if the second light source is not turned on so as to perform the color compensation for the display picture, or adjusting the brightness of the second light source of the first backlight region if the second light source has been turned on so as to perform the color compensation for the display picture.

Optionally, the third acquisition unit specifically comprises: a first acquisition module for acquiring the gray levels of respective pixels in one frame of display image; a first judgment module for determining the gray levels of respective pixels of the first display region corresponding to the first backlight region; a first determination module for determining the color proportion of the same color as the color emitted by the second light source in the first display region according to the gray levels of respective pixels of the first display region.

Optionally, the first light source is a side-type light source and the second light source is a direct-type light source.

Optionally, the first display region comprises a plurality of first display sub-regions, and the backlight module comprises a plurality of first backlight sub-regions corresponding to the plurality of first display sub-regions respectively; the third acquisition unit is specifically used to acquire the color proportion of the same color as the color emitted by the second light source in the first display sub-region corresponding to the first backlight sub-region; the third compensation unit is specifically used to turn on the second light source of the first backlight sub-region if the second light source is not turned on, or to adjust the brightness of the second light source of the first backlight sub-region if the second light source has been turned on.

An embodiment of the present disclosure provides a display device comprising the display compensation apparatus as described above.

The embodiments of the present disclosure provide a display compensation method, apparatus and display device. The display compensation method is applied to a shutter 3D display device employing a backlight partition scan mode. In the method, the brightness generated by the backlight module is obtained under the condition that the first light source is turned on, the judgment on the brightness is performed, and the second light source of the first backlight region is turned on if the brightness is within the preset brightness range, and the brightness generated by the backlight module is increased by the second light source, so that the compensation for the brightness of the display picture is achieved, thus solving the problem that the picture brightness of the shutter 3D liquid crystal display device in display is decreased in a case in which a backlight partition scan mode is employed.

In a second aspect, embodiments of the present disclosure provides another display compensation method applied to a display device comprising a display panel and a backlight module, wherein the backlight module comprises a first light source and a second light source; the display compensation method comprises: turning on the first light source; acquiring the color proportion of the same color as the color emitted by the second light source in the display panel under a condition that the first light source is turned on; determining whether the color proportion of the color is within a preset color proportion range; turning on the second light source if the color proportion is within the preset color proportion range so as to perform the color compensation for the display picture.

Optionally, the display compensation method further comprises: acquiring the color proportion of the same color as the color emitted by the second light source in the display region under a condition that the first light source and the second light source are turned on; determining whether the color proportion of the color is within a preset color proportion range; adjusting the brightness of the second light source if the color proportion is within the preset color proportion range.

Optionally, said acquiring the color proportion of the same color as the color emitted by the second light source in the display region specifically comprises: acquiring the gray levels of respective pixels in one frame of display image; determining the color proportion of the same color as the color emitted by the second light source in the display region according to the gray levels of respective pixels in the display image.

Optionally, the display panel comprises a plurality of second display regions, and the backlight module comprises a plurality of second backlight regions corresponding to the plurality of second display regions respectively; said acquiring the color proportion of the same color as the color emitted by the second light source in the display region under the condition that the first light source is turned on specifically includes: acquiring the color proportion of the same color as the color emitted by the second light source in the second display region under the condition that the first light source is turned on; said turning on the second light source if the color proportion is within the preset color proportion range specifically comprises: turning on the second light source for the second backlight region of the backlight module corresponding to the second display region if the color proportion is within the preset color proportion range.

Optionally, the first light source is a LED light source and the second light source is a laser light source.

An embodiment of the present disclosure provides another display compensation apparatus applied to a display device comprising a display panel and a backlight module, wherein the backlight module comprises a first light source and a second light source; wherein the display compensation apparatus comprises: a first switch unit for turning on the first light source; a first acquisition unit for acquiring the color proportion of the same color as the color emitted by the second light source in the display panel under a condition that the first light source is turned on; a first judgment unit for judging whether the color proportion of the color is within a preset color proportion range; a first compensation unit for turning on the second light source if the color proportion is within the preset color proportion range so as to perform the color compensation for the display picture.

Optionally, the apparatus further comprises: a second acquisition unit for acquiring the color proportion of the same color as the color emitted by the second light source in the display region under a condition that the first light source and the second light source are turned on; a second judgment unit for judging whether the color proportion of the color is within a preset color proportion range; a second compensation unit for adjusting the brightness of the second light source if the color proportion is within the preset color proportion range.

Optionally, the first acquisition unit specifically comprises: a first acquisition module for acquiring the gray levels of respective pixels in one frame of display image; a first determination module for determining the color proportion of the same color as the color emitted by the second light source in the display region according to the gray levels of respective pixels in the display image.

Optionally, the first light source is a side-type light source and the second light source is a direct-type light source.

Optionally, the display panel comprises a plurality of second display regions, and the backlight module comprises a plurality of second backlight regions corresponding to the plurality of second display regions respectively; the first acquisition unit is specifically used for acquiring the color proportion of the same color as the color emitted by the second light source in the second display region under the condition that the first light source is turned on; the first compensation unit is specifically used for turning on the second light source of the second backlight region of the backlight module corresponding to the second display region if the color proportion is within the preset color proportion range.

An embodiment of the present disclosure provides another display device comprising the display compensation apparatus as described above.

The embodiments of the present disclosure provide a display compensation method applied to a display device. In the method, the color proportion of the same color as the color emitted by the second light source in the display region is acquired under a condition that the first light source is turned on, the judgment is performed on the color proportion, the second light source is turned on if the color proportion is within the preset color proportion range, and the color compensation for the display picture is performed by the second light source, rendering more vivid color when the display device is in display.

BRIEF DESCRIPTION OF THE DRAWINGS

In order to explain embodiments of the present disclosure or technical solutions known to the inventor, drawings required to be used in description of the embodiments or technical solutions known to the inventor will be introduced simply in the following. Apparently, the attached drawings described below are only some embodiments of the present disclosure. It is possible for the ordinary skills in the art to further obtain other drawings according to these attached drawings without paying any inventive effort.

Figure 1:
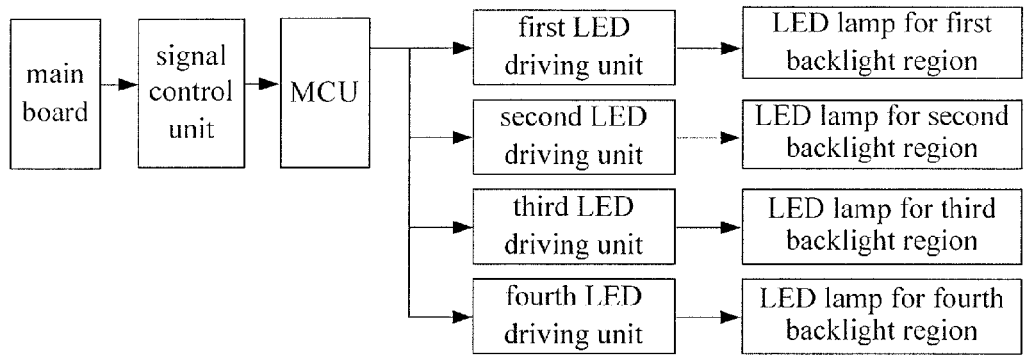
FIG. 1 is an illustrative diagram of a backlight control system of a shutter 3D display device known to the inventor.

REFERENCE SIGNS 100-display compensation apparatus; 101-first switch unit; 102-first acquisition unit; 103-first judgment unit; 104-first compensation unit; 105-second acquisition unit; 106-second judgment unit; 107-second compensation unit; 108-third acquisition unit; 1081-first acquisition module; 1082-first judgment module; 1083-first determination module; 109-third judgment unit; 110-third compensation unit; 201-first switch unit; 202-first acquisition unit; 203-first judgment unit; 204-first compensation unit; 205-second acquisition unit; 206-second judgment unit; 207-second compensation unit; 2021-first acquisition module; 2022-first determination module.

DETAILED DESCRIPTION

In the following, technical solutions in embodiments of the present disclosure will be described clearly and completely in conjunction with attached drawings in the embodiments of the present disclosure. Obviously, the described embodiments are only a part but not all of embodiments of the present disclosure. All of other embodiments obtained by the ordinary skills in the art based on the embodiments of the present disclosure without any inventive effort belong to the protection scope of the present disclosure.

The inventor notices that a shutter 3D liquid crystal TV has a strict requirement on timings of the left eye and right eye pictures, and thus tends to result in a problem of image crosstalk. Presently, the problem of crosstalk is mainly solved by using a backlight partition scan mode, that is, a backlight module is divided into several regions, and when the liquid crystal display screen corresponding to a certain region of the backlight module makes a response to the current image data, light-emitting elements in such a certain region of the backlight module are turned on and light-emitting elements in other regions of the backlight module are turned off.

In the procedure of implementing the above partition scanning, the inventor finds that the following problem can occur. When the liquid crystal display screen corresponding to a certain region of the backlight module displays a picture, in the backlight module, only light-emitting elements in the corresponding region are turned on but light-emitting elements in other regions are turned off. In this way, the light source provided by the backlight module is formed by mixing the light emitted by light-emitting elements in the corresponding region, thus the luminous intensity is decreased compared with the case in which the light source is formed by mixing the light emitted by light-emitting elements in all the regions. That is, the light intensity of light source received by the liquid crystal display screen is reduced, which thus results in the decreasing of the brightness of the display picture, and the 3D viewing effect is then affected.

In view of the above, the inventor proposes a display compensation method, apparatus and display device, which can solve the problem that the display picture brightness of a shutter 3D liquid crystal display device is decreased in a case in which a backlight partition scan mode is employed.

In order to better understand the embodiments of the present disclosure, it is firstly explained how to provide a display screen with a backlight source by using a backlight partition scan mode in a shutter 3D display device which is known to the inventor.

It is explained by taking the case in which a display panel includes four display regions and a backlight module includes four backlight regions corresponding to the four display regions respectively as an example. As an example, the four display regions can all be named as "first display regions". Optionally, for the convenience of the clear description, the four display regions can be named as "a first display region", "a second display region", "a third display region" and "a fourth display region" respectively. Accordingly, the four backlight regions corresponding to the four display regions respectively are named as "a first backlight region", "a second backlight region", "a third backlight region" and "a fourth backlight region" respectively. In the backlight module, the first backlight region, the second backlight region, the third backlight region and the fourth backlight region are provided correspondingly with a LED (Light-emitting Diode) lamp in a first backlight region, a LED lamp in a second backlight region, a LED lamp in a third backlight region and a LED lamp in a fourth backlight region respectively.

Referring to FIG. 1, a main board inputs a signal to a MCU (Micro Control Unit, for example, a Single Chip Microcomputer) through a signal control unit so as to control the turning-on and turning-off of the MCU. The MCU starts up upon reception of a turning-on signal, and controls ON and/or OFF of a LED lamp in the backlight region by inputting a control signal to a LED driving unit. For example, the MCU can control the ON and/or OFF of a LED lamp in a first backlight region by inputting a control signal to a first LED driving unit.

In the following, the procedure that the backlight module provides a backlight source when the display screen displays one frame of picture is described in detail. The MCU starts up after receiving the turning-on signal. When a first display region displays a picture, the MCU turns on the LED lamp in first backlight region by inputting a turning-on signal to the first LED driving unit while turning off LED lamps in the backlight regions corresponding to other display regions by inputting turning-off signals to other LED driving units. When a second display region of the display screen displays a picture, the MCU turns on the LED lamp in a second backlight region by inputting the turning-on signal to a second LED driving unit while turning off the LED lamp in the first backlight region by inputting the turning-off signal to the first LED driving unit. When a third display region of the display screen displays a picture, the MCU turns on a LED lamp in a third backlight region by inputting the turning-on signal to a third LED driving unit while turning off the LED lamp in the second backlight region by inputting the turning-off signal to the second LED driving unit. When a fourth display region of the display screen displays a picture, the MCU turns on a LED lamp in a fourth backlight region by inputting the turning-on signal to a fourth LED driving unit while turning off the LED lamp in the third backlight region by inputting the turning-off signal to the third LED driving unit. Thus, displaying of one frame of picture is completed.

According to a first embodiment of the present disclosure, there is provided a display compensation method applied to a shutter 3D display device including a display panel and a backlight module. The backlight module includes first light source and second light source, the display panel includes multiple first display regions, the backlight module includes multiple first backlight regions corresponding to the multiple first display regions respectively, and the multiple first backlight regions of the backlight module are turned on in sequence.

Figure 2:
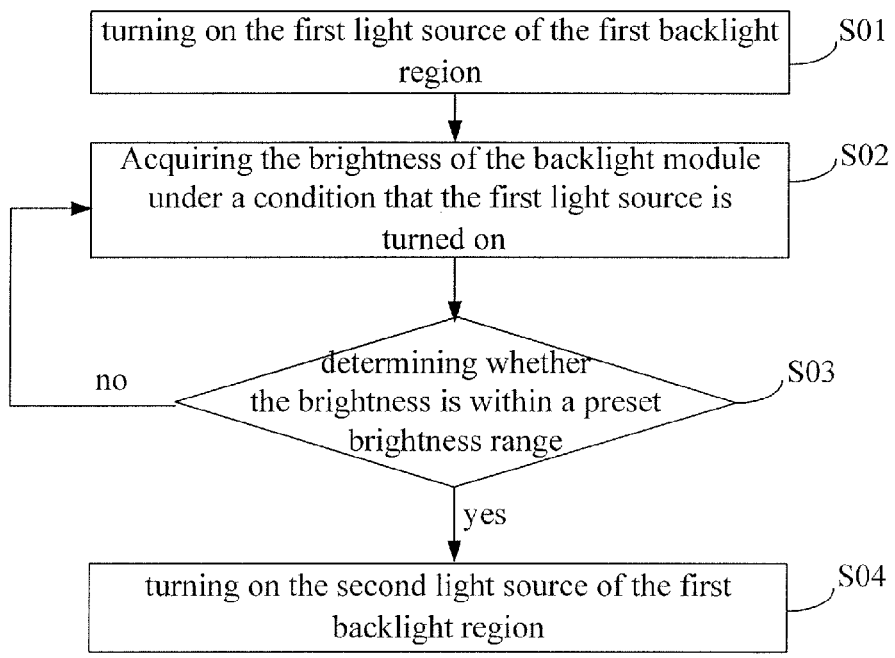
FIG. 2 is a schematic flow chart of a display compensation method, which is applied to a shutter 3D display device, provided by an embodiment of the present disclosure.

Referring to FIG. 2, the display compensation method includes the following: At step S01, the first light source of the first backlight region is turned on.

Specifically, when the first display region corresponding to the first backlight region displays a picture, the first light source of the first backlight region is turned on. The first light source can be a LED lamp or can be other light-emitting elements. In addition, the first light source can be a monochromatic light source emitting only a single color, for example, a red light source, a green light source, a yellow light source, etc, or can be a light source formed by mixing the light of various colors, for example, a white light source, and there is no limitation thereto.

Figure 6:
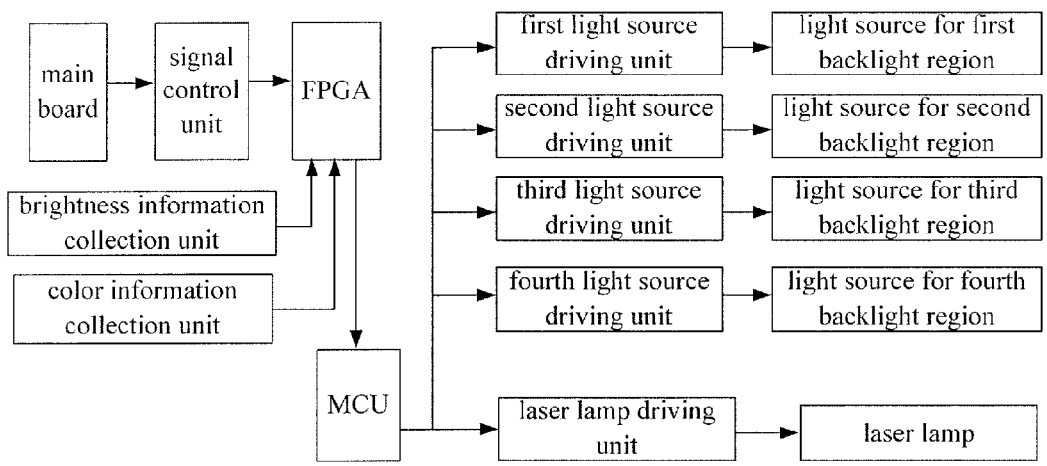
FIG. 6 is an illustrative diagram of a backlight control system of a shutter 3D display device provided by an embodiment of the present disclosure.

In practice, as illustrated in FIG. 6, when the first display region corresponding to the first backlight region displays a picture, the main board inputs a control signal to an FPGA (Field Programmable Gate Array) through a signal control unit so as to turn on the FPGA. The FPGA inputs a signal to an MCU to turn on the MCU. Upon reception of the control signal output from the FPGA, the MCU turns on the light source of the first backlight region through a first light source driving unit.

At step S02, the brightness of the backlight module under a condition that the first light source is turned on is acquired.

The backlight module further includes a light guide plate for causing the light emitted by the light source being uniformly illuminated on a display panel. Specifically, the brightness value of the light homogenized by the light guide plate can be acquired.

In practice, as illustrated in FIG. 6, a brightness information collection unit can acquire the brightness value of the light homogenized by the light guide plate through an element such as a sensor, and inputs the brightness value to the FPGA at the same time.

At step S03, it is determined whether the brightness is within a preset brightness range.

Specifically, the preset brightness range can be 0-90 $cd/m^2$. In practice, as illustrated in FIG. 6, the FPGA performs the comparison and judgment on the acquired brightness value so as to determine whether the brightness value is within the preset brightness range. It should be noted that embodiments of the present disclosure do not limit the preset brightness range. Here, the description is made by taking the case in which the preset brightness is within range of 0-90 $cd/m^2$ as an example. Specifically, the preset brightness range can be adjusted according to the actual situation. For example, if the brightness of display picture is required to be 120 $cd/m^2$ in practice, then the preset brightness range in embodiments of the present disclosure can be 0-120 $cd/m^2$, that is, as long as the brightness of the display picture is below 120 $cd/m^2$, the corresponding compensation is performed. If the brightness range of display picture is required to be 220-300 $cd/m^2$ in practice, then the preset brightness range in embodiments of the present disclosure can be 0-L$cd/m^2$, in which the range of L can be 220-300 $cd/m^2$.

At step S04, if the brightness is within the preset brightness range, the second light source for the first backlight region is turned on so as to perform the display brightness compensation for a display picture.

Specifically, in a case that the brightness is below 90 $cd/m^2$, the second light source of the first backlight region can be turned on to perform the display brightness compensation for the display picture. The second light source can be a laser lamp or can be other light-emitting elements capable of emitting light, and is not limited herein.

In practice, as illustrated in FIG. 6, the FPGA judges and determines that the brightness value is within the brightness range of 0-90 $cd/m^2$, and then inputs the control signal to the MCU. After receiving the control signal, the MCU turns on a laser lamp through a laser lamp driving unit, and thus the brightness compensation is realized.

It should be noted that, in a case that the brightness is not within the preset brightness range, as illustrated in FIG. 2, the procedure can return to the step S02 so as to achieve real-time acquisition of the brightness of the backlight module under the condition that the first light source is turned on.

The embodiment of the present disclosure provides a display compensation method applied to a shutter 3D display device employing a backlight partition scan mode. In the method, the brightness of the backlight module is obtained under the condition that the first light source is turned on, the judgment on the brightness is performed, and the second light source of the first backlight region is turned on if the brightness is within the preset brightness range, and the brightness of the backlight module is increased by the second light source, so that the compensation for the brightness of the display picture is achieved, thus solving the problem that the picture brightness of the shutter 3D liquid crystal display device in display is decreased in a case in which a backlight partition scan mode is employed.

Figure 3:
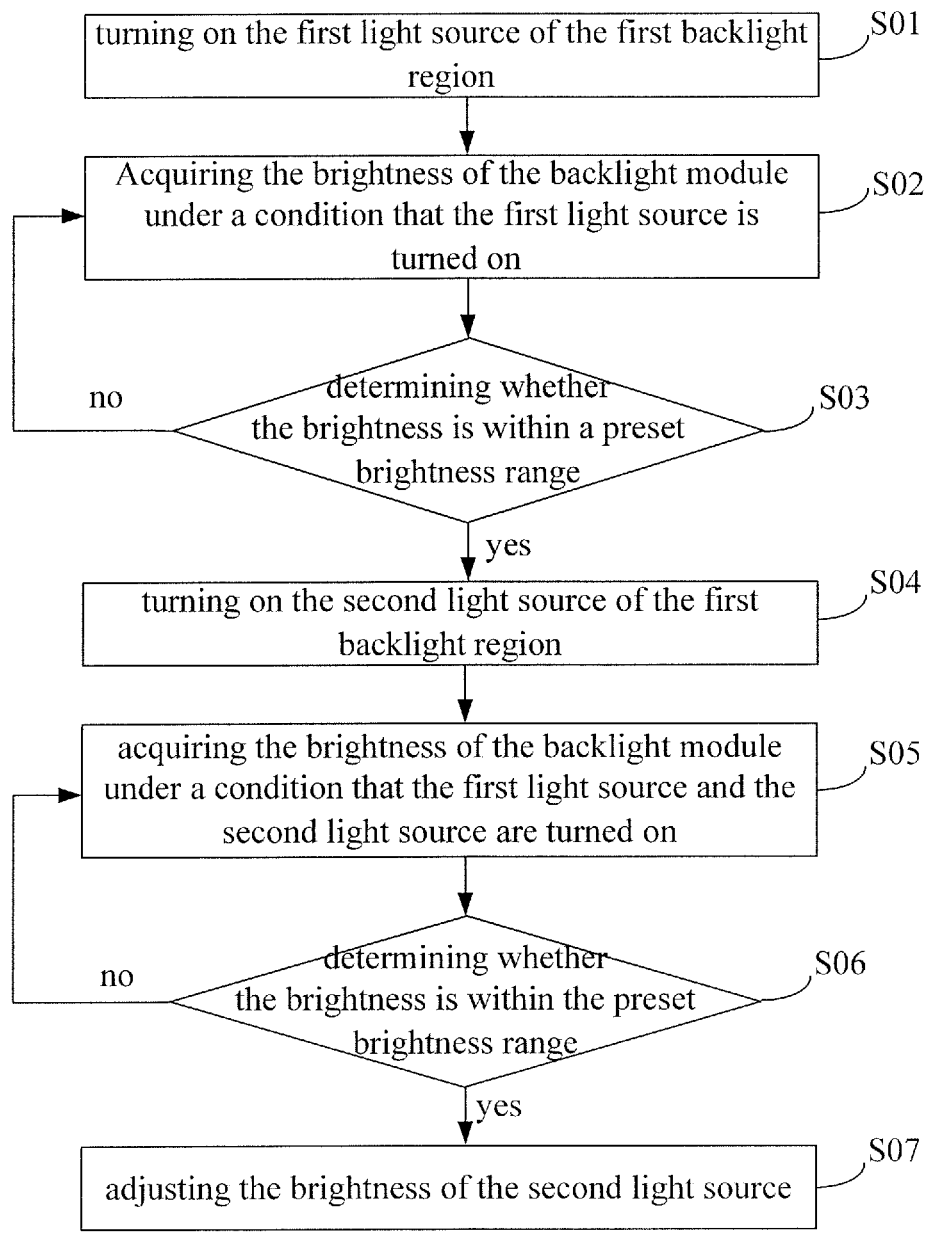
FIG. 3 is a schematic flow chart of another display compensation method, which is applied to a shutter 3D display device, provided by an embodiment of the present disclosure.

Further, after the second light source for the first backlight region is turned on to perform the brightness compensation for the display picture for one time, in order to judge the effect of the brightness compensation and whether it needs to make compensation again, as illustrated in FIG. 3, the display compensation method further includes the following steps.

At step S05, the brightness of the backlight module is acquired under a condition that the first light source and the second light source are turned on. As illustrated in FIG. 6, the brightness information collection unit can acquire the brightness value of the light homogenized by the light guide plate through a device such as a sensor, and output the brightness value to the FPGA at the same time.

Specifically, the brightness value of the light homogenized by the light guide plate can be acquired.

At step S06, it is determined whether the brightness is within the preset brightness range.

Specifically, the preset brightness range can be 0-90 $cd/m^2$. In practice, as illustrated in FIG. 6, the FPGA performs the comparison and judgment on the acquired brightness value so as to determine whether the brightness value is within the preset brightness range of 0-90 $cd/m^2$. It should be noted that embodiments of the present disclosure do not put any limitation on the preset brightness range. Here, the description is made by taking the preset brightness range of 0-90 $cd/m^2$ as an example. Specifically, the preset brightness range can be adjusted according to the actual situation. For example, if the brightness of display picture is required to be 120 $cd/m^2$ in practice, then the preset brightness range in embodiments of the present disclosure can be 0-120 $cd/m^2$, that is, as long as the brightness of the display picture is below 120 $cd/m^2$, the corresponding compensation is performed. If the brightness range of display picture is required to be 220-300 $cd/m^2$ in practice, then the preset brightness range in embodiments of the present disclosure can be 0-L$cd/m^2$, in which the range of L can be 220-300 $cd/m^2$.

At step S07, the brightness of the second light source is adjusted if the brightness is within the preset brightness range.

Specifically, in a case that the brightness value is below 90 $cd/m^2$, the brightness of the second light source can be increased by adjusting the voltage or current of the second light source, thus further compensating for the brightness of the display picture. In practice, as illustrated in FIG. 6, the FPGA determines that the brightness value is within the brightness range of 0-90 $cd/m^2$ after making a judgment, and then inputs the control signal to the MCU. After receiving the signal, the MCU adjusts the brightness of the laser lamp through the laser lamp driving unit, thus further performing the brightness compensation for the display picture.

It should be noted that, in a case that the brightness is not within the preset brightness range, as illustrated in FIG. 3, the procedure can return step S05 so as to achieve real-time acquisition of the brightness of the backlight module under the condition that the first light source and the second light source are turned on.

Figure 4:
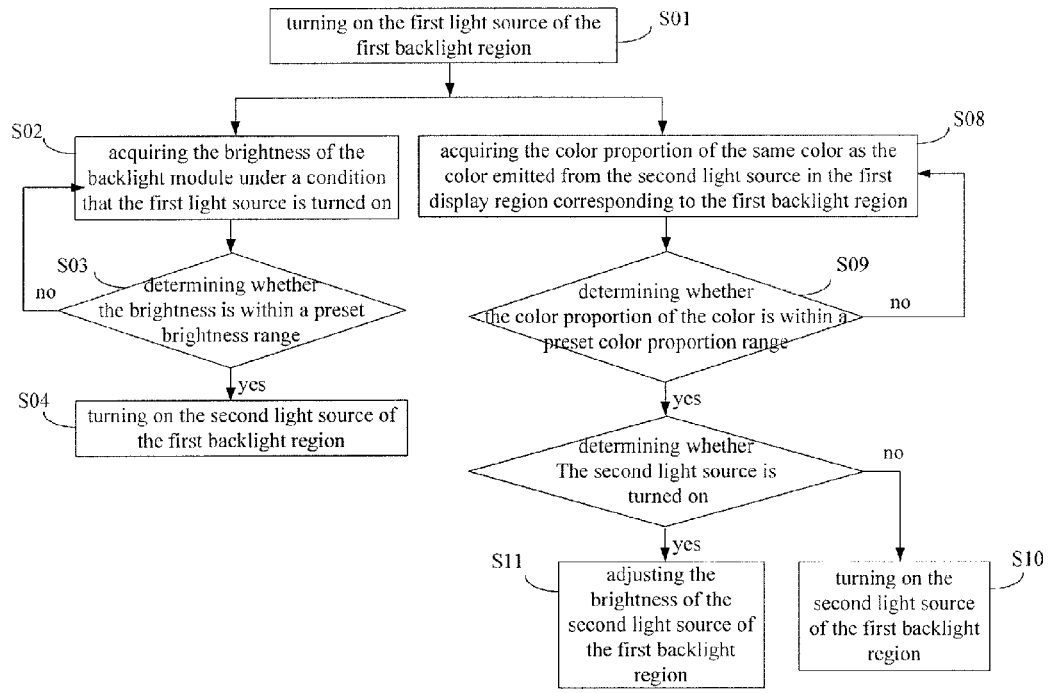
FIG. 4 is a schematic flow chart of a further display compensation method, which is applied to a shutter 3D display device, provided by an embodiment of the present disclosure.

Optionally, in a case that the second light source is a monochromatic light source, as illustrated in FIG. 4, the display compensation method further includes the following steps.

At step S08, the color proportion of the same color as the color emitted by the second light source in the first display region corresponding to the first backlight region is acquired. In practice, as illustrated in FIG. 6, the color proportion of the same color as the color emitted by the second light source in the first display region can be acquired by a color information collection unit, and the color proportion is input to the FPGA at the same time.

Figure 5:
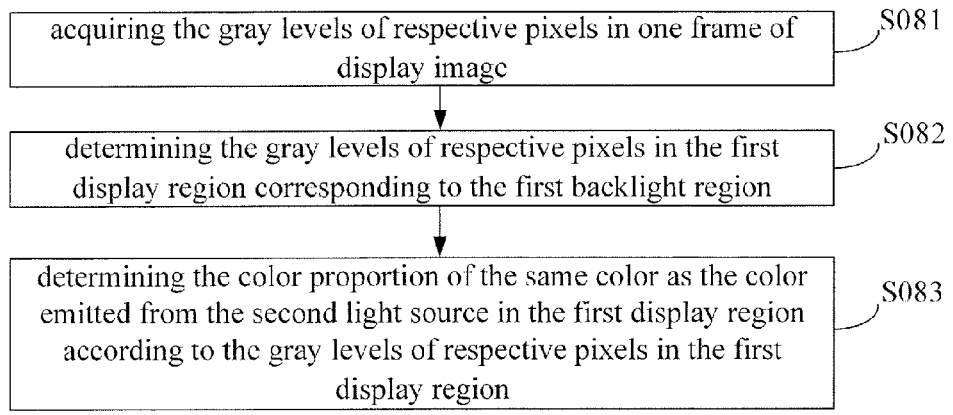
FIG. 5 is a schematic flow chart of step S08 in FIG. 4.

Specifically, as illustrated in FIG. 5, step S08 can include the following steps.

At step S081, the gray levels of respective pixels in one frame of display image is acquired.

Specifically, each pixel includes three sub-pixels R (Red), G (Green), B (Blue), and sub-pixels of each color can show different brightness levels. The gray levels represent the levels of different brightness ranged from the darkest level to the brightest level. Different colors can be formed by three sub-pixels R, G, B with different brightness. That is, the color variation of each pixel on the display screen is due to the gray level variation of R, G, B sub-pixels which constitute such a pixel. Thus, the gray level of each pixel can be represented by the RGB values of the pixel. Accordingly, it is needed to acquire the RGB values of respective pixels in one frame of display image.

At step S082, the gray levels of respective pixels in the first display region corresponding to the first backlight region is determined.

Specifically, the RGB values the gray levels of respective pixels in the first display region corresponding to the first backlight region is determined.

At step S083, the color proportion of the same color as the color emitted by the second light source in the first display region is determined according to the gray levels of respective pixels in the first display region.

Specifically, the color proportion of the same color as the color emitted by the second light source in the first display region can be determined according to the RGB values of respective pixels in the first display region. For example, if the second light source is a red light source, then the proportion of red pixels in the first display region is calculated. Specifically, the RGB value of a red pixel is (255, 0, 0) which is represented in hexadecimal as #FF0000. Accordingly, it is needed to calculate the proportion of pixels whose RGB value is (255, 0, 0), i.e. #FF0000, to all of pixels in the first display region.

Optionally, the RGB values of respective pixels in the first display region can also be transformed into an HSV color model including three parameters, i.e. H (Hue), S (Saturation), V (Value of brightness), wherein the hue values H of respective pixels are calculated so as to determine the color proportion of the same color as the color emitted by the second light source in the first display region. For example, if the second light source is a red light source, then H corresponding to red is 120°. The respective hue values H of respective pixels in the first display region are calculated according to the RGB values of respective pixels and the proportion of pixels with H of 120° to all of pixels in the first display region is then determined.

Of course, the approach of determining the color proportion of the same color as the color emitted by the second light source in the first display region according to the gray levels of respective pixels in the first display region is not limited to the above two approaches. The embodiments of the present disclosure do not put any limitation on this, and the specific approach is determined according to actual situations.

At step S09, it is determined whether the color proportion of the color is within a preset color proportion range.

Specifically, in a case that the proportion of pixels having the same color as the color emitted by the second light source in the first display region can be larger than 40%, it is regarded that the color proportion of the color is within the preset color proportion range. It should be noted that embodiments of the present disclosure do not put any limitation on the preset color proportion range. Here, the description is made by only taking a case in which the preset color proportion range is larger than 40% as an example. The preset color proportion range can be adjusted specifically according to actual situations. For example, the preset color proportion range can also be 30-80% or larger than 70%.

In practice, as illustrated in FIG. 6, the FPGA performs the comparison and judgment on the acquired color proportion so as to determine whether the color proportion is within the preset color proportion range.

In a case that the color proportion is within the preset color proportion range, the following steps are executed.

At step S10, if the second light source is not turned on, the second light source of the first backlight region is turned on so as to perform the color compensation for the display picture.

Or, at step S11, if the second light source has been turned on, the voltage or the current of the second light source of the first backlight region is adjusted so as to perform the color compensation for the display picture.

In practice, as illustrated in FIG. 6, the FPGA determines that the color proportion is larger than 40% after making a judgment, and then inputs the control signal to the MCU. After receiving the signal, the MCU judges whether the laser lamp is turned on, and turns on the laser lamp of the first backlight region through the laser lamp driving unit if the laser lamp is not turned on, or increases the current of the laser lamp of the first backlight region through the laser lamp driving unit if the laser lamp has been turned on, so as to perform the color compensation for the display picture.

It should be noted here that, in a case that the color proportion is within the preset color proportion range, the color compensation can be performed for one frame of picture for one time, that is, color compensation is completed for one time after step S10 or S11 is performed. Of course, the compensation can be performed for multiple times. Specifically, after the completion of step S10 or S11, the procedure returns to step S09, and if the color proportion is within the preset color proportion range, step S11 is executed again, that is, the color compensation is performed for two times. Similarly, the compensation can be performed for multiple times. The present disclosure does not put any limitation on this and the number of the compensation can be determined depending on actual situations.

Through steps S08-S10 or steps S08-S11 as described above, if the color proportion of the same color as the color emitted by the second light source in the first display region corresponding to the first backlight region is within the preset color proportion range, the color compensation can be performed for the color by the second light source, rendering the displayed color more vivid, and thus the display effect is further improved.

Optionally, the first light source can be a side-type light source, which is advantageous to reduce the thickness of the backlight board, and the second light source can be a direct-type light source, which is advantageous to perform the brightness and color compensation for the display picture.

Optionally, the above first display region can further include multiple first display sub-regions, and the backlight module includes multiple first backlight sub-regions corresponding to the display sub-regions, and steps S08-S10 or steps S08-S11 of the display compensation method are specifically as follows.

At step S08, acquiring the color proportion of the same color as the color emitted by the second light source in the first display region corresponding to the first backlight region specifically includes acquiring the color proportion of the same color as the color emitted by the second light source in the first display sub-region corresponding to the first backlight sub-region.

At step S09, it is determined whether the color proportion of the color is within a preset color proportion range.

In a case that the color proportion is within the preset color proportion range, the following steps are executed.

At step S10, turning on the second light source of the first backlight region if the second light source is not turned on specifically includes turning on the second light source of the first backlight sub-region if the second light source is not turned on.

Or, at step S11, adjusting the brightness of the second light source of the first backlight region if the second light source has been turned on specifically includes adjusting the brightness of the second light source of the first backlight sub-region if the second light source has been turned on.

In the above method, the compensation can be performed for the first display sub-region by the second light source of the first backlight sub-region, that is, the partitioned compensation is performed for the first display region, thus more accurate compensation is realized and the quality of display picture is further improved.

In the following, an embodiment of the present disclosure provides a display compensation apparatus corresponding to the above display compensation method. It should be noted that respective units included in the apparatus below can execute the corresponding steps in the above method, and thus the respective units of the apparatus are not described in detail in the following embodiments.

Figure 7:
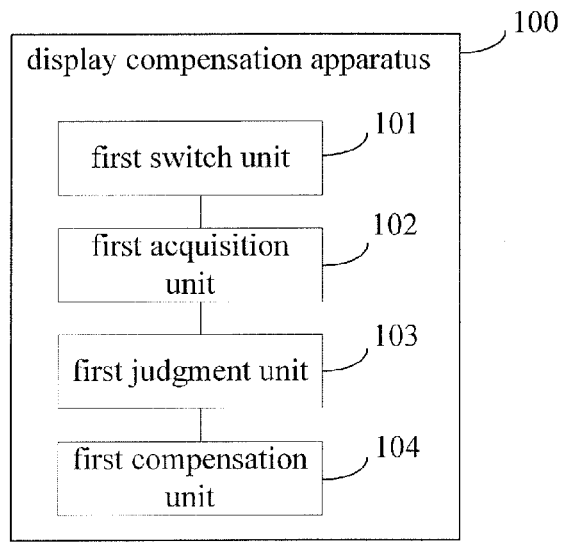
FIG. 7 is a schematic diagram of a display compensation apparatus, which is applied to a shutter 3D display device, provided by an embodiment of the present disclosure.

The embodiment of the present disclosure provides a display compensation apparatus applied to a shutter 3D display device including a display panel and a backlight module. The backlight module includes a first light source and a second light source, the display panel includes multiple first display regions, the backlight module includes multiple first backlight regions corresponding to the first display regions, and the multiple first backlight regions of the backlight module are turned on in sequence. As illustrated in FIG. 7, the display compensation apparatus includes the following units.

A first switch unit 101 is used for turning on the first light source of the first backlight region.

Specifically, when the first display region corresponding to the first backlight region displays a picture, the first light source of the first backlight region is turned on by the first switch unit 101. The first light source can be a LED lamp or can be other light-emitting elements. In addition, the first light source can be a monochromatic light source emitting only a single color, for example, a red light source, a green light source, a yellow light source, etc, or can be a light source formed by mixing the light emitted by light sources with different colors, for example, a white light source, and the present disclosure does not put any limitation on this.

A first acquisition unit 102 is used for acquiring the brightness of the backlight module under a condition that the first light source is turned on.

The backlight module further includes a light guide plate for allowing the light emitted by the light source to be uniformly illuminated on a display panel. Specifically, the brightness value of the light homogenized by the light guide plate can be acquired by the first acquisition unit 102.

A first judgment unit 103 is used for judging whether the brightness is within a preset brightness range.

Specifically, the preset brightness range can be 0-90 $cd/m^2$. The first judgment unit performs the comparison and judgment on the acquired brightness value so as to determine whether the brightness value is within the preset brightness range of 0-90 $cd/m^2$. It should be noted that embodiments of the present disclosure do not put any limitation on the preset brightness range. Here, the description is made by taking the preset brightness range of 0-90 $cd/m^2$ as an example. Specifically, the preset brightness range can be adjusted according to the actual situation. For example, if the brightness of display picture is required to be 120 $cd/m^2$ in practice, then the preset brightness range in embodiments of the present disclosure can be 0-120 $cd/m^2$, that is, as long as the brightness of the display picture is below 120 $cd/m^2$, the corresponding compensation is performed. If the brightness range of display picture is required to be 220-300 $cd/m^2$ in practice, then the preset brightness range in embodiments of the present disclosure can be 0-L$cd/m^2$, in which the range of L can be 220-300 $cd/m^2$.

A first compensation unit 104 is used for turning on the second light source of the first backlight region if the brightness is within the preset brightness range so as to perform the display brightness compensation for a display picture.

Specifically, in a case that the brightness is below 90 $cd/m^2$, the second light source of the first backlight region can be turned on to perform the display brightness compensation for the display picture. The second light source can be a laser lamp or can be other light-emitting elements capable of emitting light, and there is no limitation on this.

The embodiment of the present disclosure provides a display compensation apparatus applied to a shutter 3D display device employing a backlight partition scan mode. In the display compensation apparatus, the first acquisition unit acquires the brightness of the backlight module under the condition that the first light source is turned on, the first judgment unit performs the judgment on the brightness, and the first compensation unit turns on the second light source of the first backlight region if the brightness is within the preset brightness range, and the second light source increases the brightness of the backlight module, so that the apparatus realizes the brightness compensation for the display picture, and thus solves the problem that the display picture brightness of the shutter 3D liquid crystal display device is decreased in a case in which a backlight partition scan mode is employed.

Figure 8:
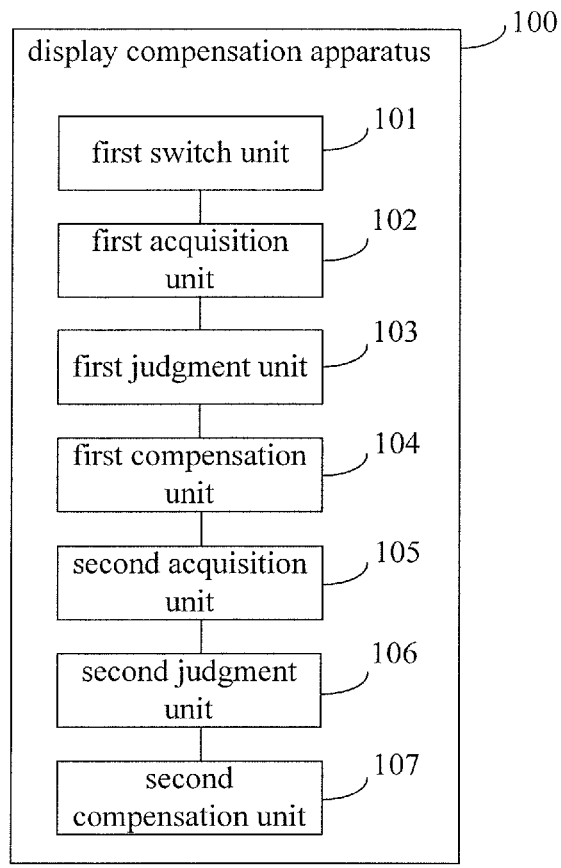
FIG. 8 is a schematic diagram of another display compensation apparatus, which is applied to a shutter 3D display device, provided by an embodiment of the present disclosure.

Further, after the second light source of the first backlight region is turned on by the first compensation unit to perform the brightness compensation for the display picture for one time, in order to judge the effect of the brightness compensation and determine whether it needs to compensate for the brightness again, as illustrated in FIG. 8, the display compensation apparatus 100 further includes the following units.

A second acquisition unit 105 is used for acquiring the brightness of the backlight module under a condition that the first light source and the second light source are turned on.

Specifically, the brightness value of the light homogenized by the light guide plate can be acquired by the second acquisition unit 105.

A second judgment unit 106 is used for judging whether the brightness is within the preset brightness range.

Specifically, the preset brightness range can be 0-90 cd/m$^2$. The second judgment unit performs the comparison and judgment on the acquired brightness value so as to determine whether the brightness value is within the preset brightness range of 0-90 cd/m$^2$. It should be noted that embodiments of the present disclosure do not put any limitation on the preset brightness range. Here, the description is made by taking the preset brightness range of 0-90 cd/m$^2$ as an example. Specifically, the preset brightness range can be adjusted according to the actual situation. For example, if the brightness of display picture is required to be 120 cd/m$^2$ in practice, then the preset brightness range in embodiments of the present disclosure can be 0-120 cd/m$^2$, that is, as long as the brightness of the display picture is below 120 cd/m$^2$, the corresponding compensation is performed. If the brightness range of display picture is required to be 220-300 cd/m$^2$ in practice, then the preset brightness range in embodiments of the present disclosure can be 0-Lcd/m$^2$, in which the range of L can be 220-300 cd/m$^2$.

A second compensation unit 107 is used for adjusting the brightness of the second light source if the brightness is within the preset brightness range.

Specifically, in a case that the brightness value is below 90 cd/m$^2$, the brightness of the second light source can be increased by adjusting the voltage or current of the second light source, and thus the brightness compensation is further performed for the display picture.

Figure 9:
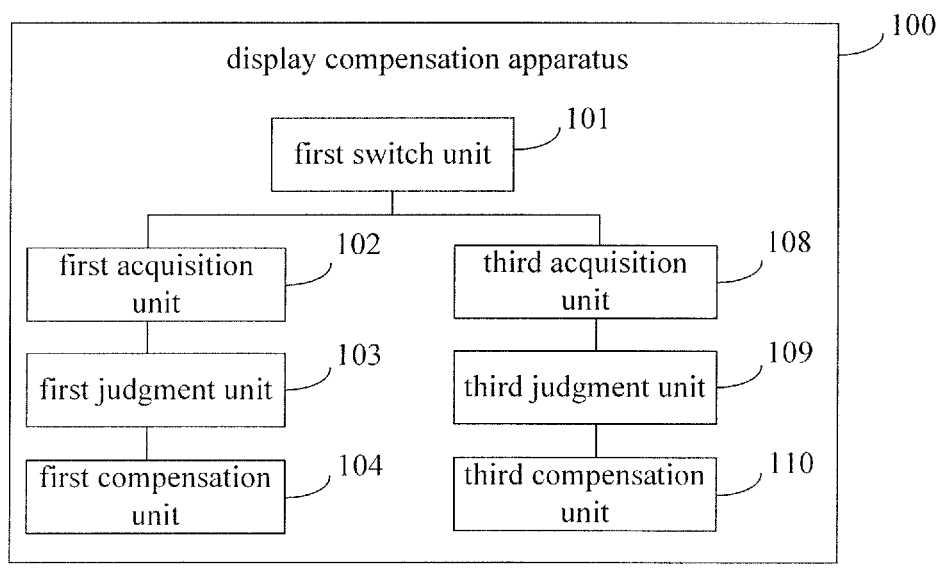
FIG. 9 is a schematic diagram of a further display compensation apparatus, which is applied to a shutter 3D display device, provided by an embodiment of the present disclosure.

Optionally, in a case that the second light source is a monochromatic light source, as illustrated in FIG. 9, the display compensation apparatus 100 further includes the following units.

A third acquisition unit 108 is used for acquiring the color proportion of the same color as the color emitted by the second light source in the first display region corresponding to the first backlight region.

Figure 10:
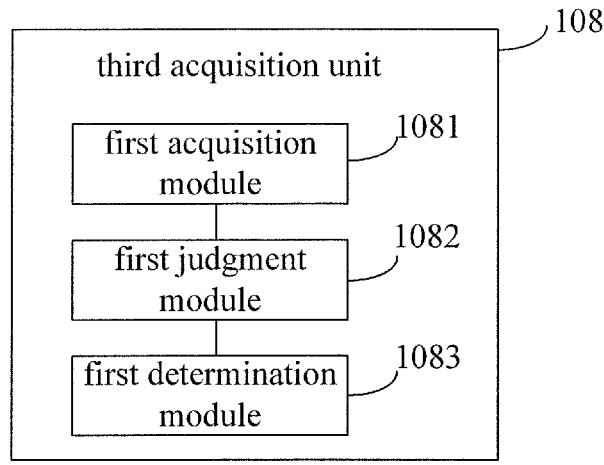
FIG. 10 is a schematic diagram of the third acquisition unit in FIG. 9.

Further, as illustrated in FIG. 10, the third acquisition unit 108 specifically includes the following modules.

A first acquisition module 1081 is used for acquiring the gray level of each pixel in one frame of display image.

Specifically, each pixel comprises three sub-pixels R (Red), G (Green), B (Blue), and sub-pixels of each color can show different brightness levels. The gray levels represent levels of different brightness ranged from the darkest level to the brightest level. Three sub-pixels R, G, B with different brightness are combined to form different colors. That is, the color variation of each pixel on the display screen is due to the gray level variation of R, G, B sub-pixels which constitute such a pixel. Thus, the gray level of each pixel can be represented by the RGB values of the pixel. Accordingly, the first acquisition module 1081 needs to acquire the RGB values of respective pixels in one frame of display image.

A first judgment module 1082 is used for determining the gray levels of respective pixel of the first display region corresponding to the first backlight region.

Specifically, the RGB values of respective pixels in the first display region corresponding to the first backlight region are determined by the first judgment module 1082.

A first determination module 1083 is used for determining the color proportion of the same color as the color emitted by the second light source in the first display region according to the gray levels of respective pixels of the first display region.

Specifically, the color proportion of the same color as the color emitted by the second light source in the first display region can be determined by the first determination module 1083 according to the RGB values of respective pixels of the first display region. For example, if the second light source is a red light source, then the proportion of red pixels in the first display region is calculated. Specifically, the RGB value of a red pixel is (255, 0, 0) which is represented in hexadecimal as #FF0000. Accordingly, it is needed to calculate the proportion of pixels whose RGB value is (255, 0, 0), i.e. #FF0000, to all of pixels in the first display region.

Optionally, the first determination module 1083 can also transform the RGB values of respective pixels of the first display region into an HSV color model in which HSV includes three parameters, i.e. H (Hue), S (Saturation), V (Value of brightness), and solve H values of respective pixels so as to determine the color proportion of the same color as the color emitted by the second light source in the first display region. For example, if the second light source is a red light source, then H value corresponding to red is 120°. The H values of respective pixels in the first display region are solved according to the RGB values of respective pixels and the proportion of pixels with H of 120° to all of pixels in the first display region is then determined.

A third judgment unit 109 is used for determining whether the color proportion of the color is within a preset color proportion range.

Specifically, the third judgment unit 109 judges whether the proportion of pixels having the same color as the color emitted by the second light source in the first display region is larger than 40%. If it is true, the color proportion of the color is considered within the preset color proportion range. It should be noted that embodiments of the present disclosure do not put any limitation on the preset color proportion range. Here, the description is made by taking the preset color proportion range of larger than 40% as an example. The preset color proportion range can be adjusted specifically according to actual situations. For example, the preset color proportion range can also be 30-80% or larger than 70%.

A third compensation unit 110 is used for, if the color proportion is within the preset color proportion range, turning on the second light source of the first backlight region if the second light source is not turned on so as to perform the color compensation for the display picture; or adjusting the brightness of the second light source of the first backlight region if the second light source has been turned on so as to perform the color compensation for the display picture.

In the above display compensation apparatus, if the color proportion of the same color as the color emitted by the second light source in the first display region corresponding to the first backlight region is within the preset color proportion range, the color compensation can be performed for the color by the third compensation unit, rendering the color to be displayed more vivid, and thus the display effect is further improved.

Optionally, the first light source can be a side-type light source which is advantageous to reduce the thickness of the backlight board, and the second light source can be a direct-type light source which is advantageous to perform the brightness and color compensation for the display picture.

Optionally, the first display region includes multiple first display sub-regions, and the backlight module includes multiple first backlight sub-regions corresponding to the display sub-regions.

The third acquisition unit is specifically used to acquire the color proportion of the same color as the color emitted by the second light source in the first display sub-region corresponding to the first backlight sub-region The third compensation unit is specifically used to turn on the second light source of the first backlight sub-region if the second light source is not turned on, or to adjust the brightness of the second light source of the first backlight sub-region if the second light source has been turned on.

In the above display compensation apparatus, the compensation can be performed for the first display sub-region by the third compensation unit, that is, the partitioned compensation is performed for the first display region, and thus more accurate compensation is realized and the quality of display picture is further improved.

An embodiment of the present disclosure provides a display device including the display compensation apparatus as described above. When the display device displays a 3D picture, the brightness is higher, the color is more vivid and the display effect is improved.

Figure 11:
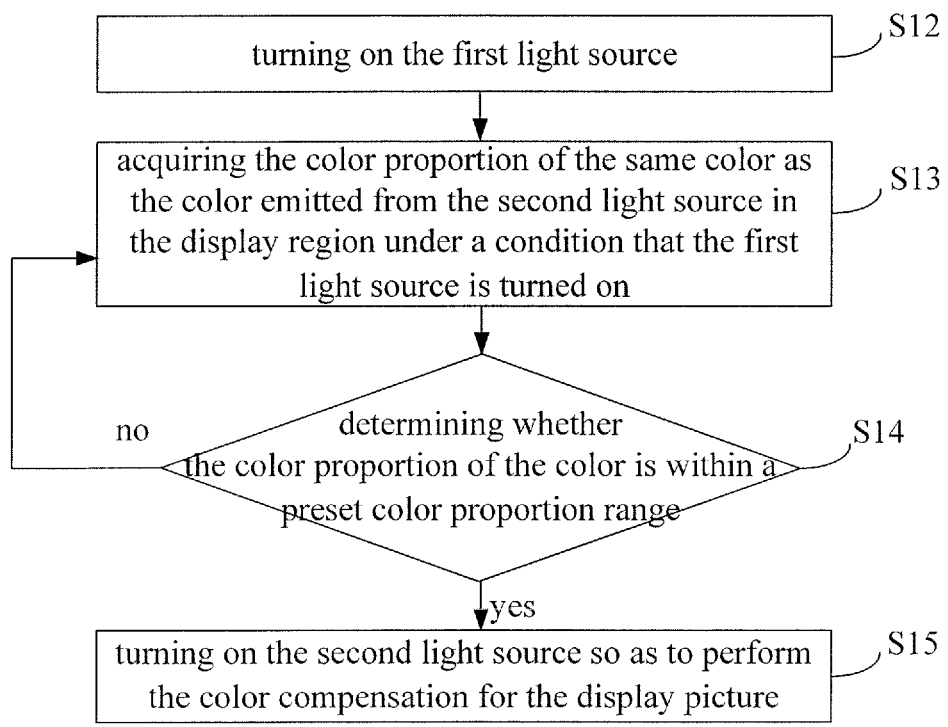
FIG. 11 is a schematic flow chart of a display compensation method, which is applied to a display device, provided by an embodiment of the present disclosure.

According to a second embodiment of the present disclosure, there is provided a display compensation method applied to a display device including a display panel and a backlight module. The display panel includes a display region, the backlight module includes a first light source and a second light source, and the second light source is a monochromatic light source. As illustrated in FIG. 11, the display compensation method includes the following steps.

At step S12, the first light source is turned on.

Specifically, the backlight module turns on the first light source to provide the display panel with a backlight. The first light source can be a LED lamp or can be other light-emitting elements. In addition, the first light source can be a monochromatic light source emitting only a single color, for example, a red light source, a green light source, a yellow light source, etc, or can be a light source formed by mixing the lights from light sources with different colors, for example, a white light source, and is not limited in particular herein.

At step S13, the color proportion of the same color as the color emitted by the second light source in the display region is acquired under a condition that the first light source is turned on.

Specifically, it is possible to acquire the gray levels of respective pixels in the display region so as to determine the color proportion of the same color as the color emitted by the second light source in the display region.

At step S14, it is determined whether the color proportion of the color is within a preset color proportion range.

Specifically, in a case that the proportion of pixels having the same color as the color emitted by the second light source in the display region is larger than 40%, the color proportion of the color is considered within the preset color proportion range. It should be noted that embodiments of the present disclosure do not put any limitation the preset color proportion range. Here, the description is made by taking the preset color proportion range of larger than 40% as an example. The preset color proportion range can be adjusted specifically according to actual situations. For example, the preset color proportion range can also be 30-80% or larger than 70%.

At step S15, if the color proportion is within the preset color proportion range, the second light source is turned on so as to perform the color compensation for the display picture.

Specifically, in a case that the proportion of pixels having the same color as the color emitted by the second light source in the display region is larger than 40%, the second light source is turned on to perform the color compensation for the display picture. The second light source can be a laser lamp or can be other light-emitting elements capable of emitting light, and there is no limitation on this. It is needed that the light emitted by the second light source is monochromatic.

The embodiment of the present disclosure provides a display compensation method applied to a display device. In the method, the color proportion of the same color as the color emitted by the second light source in the display region is acquired under a condition that the first light source is turned on, the judgment on the color proportion is made, and the second light source is turned on if the color proportion is within the preset color proportion range, the color compensation for the display picture is performed by the second light source, so as to make the color more vivid when the display device realizes displaying.

Figure 12:
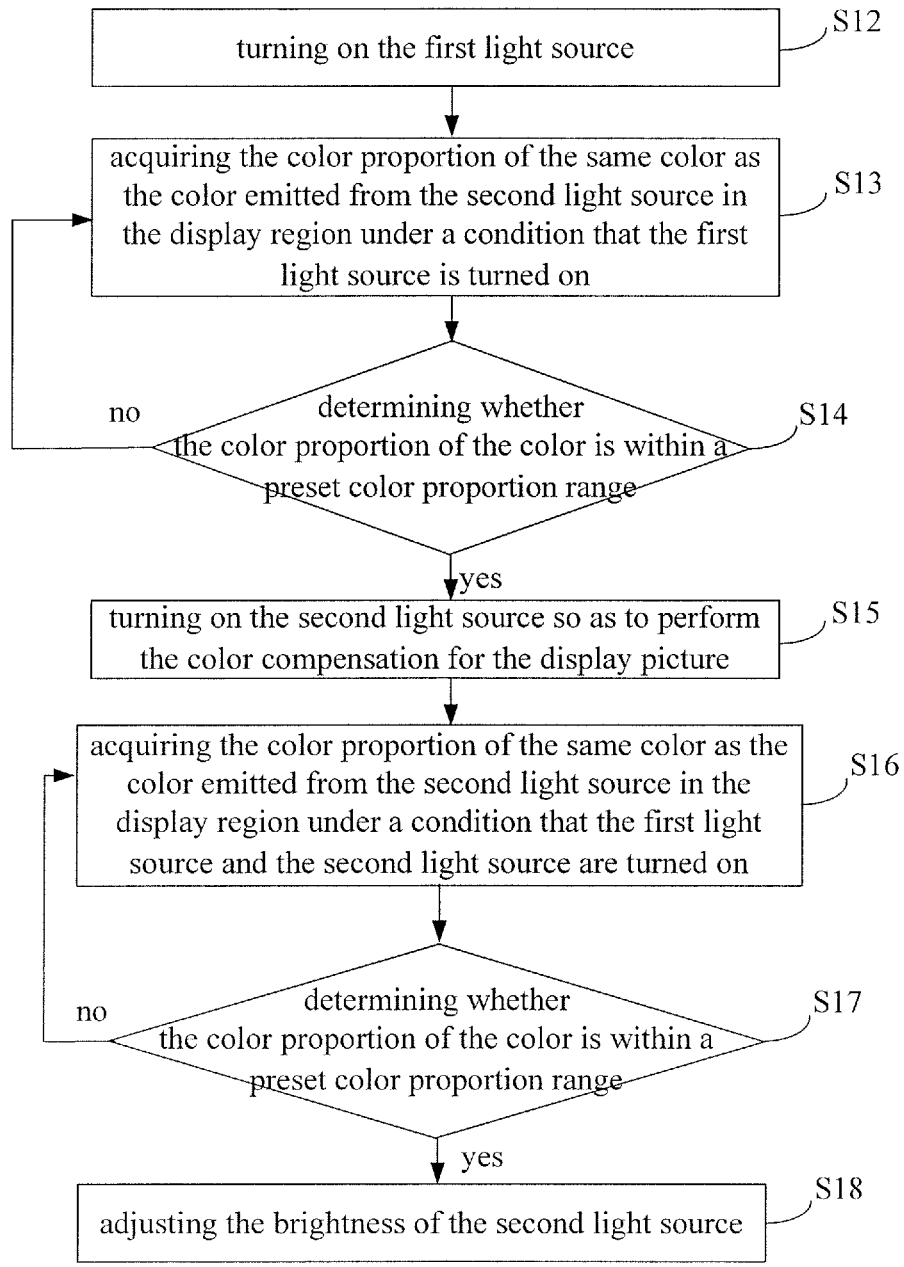
FIG. 12 is a schematic flow chart of another display compensation method, which is applied to a display device, provided by an embodiment of the present disclosure.

Further, after the second light source is turned on to perform the color compensation for the display panel for one time, in order to judge the effect of the color compensation and determine whether it needs to make compensation for the display again, as illustrated in FIG. 12, the display compensation method further includes the following steps.

At step S16, the color proportion of the same color as the color emitted by the second light source in the display region is acquired under a condition that the first light source and the second light source are turned on.

Specifically, it is possible to acquire the gray levels of respective pixels in the display region so as to determine the color proportion of the same color as the color emitted by the second light source in the display region.

At step S17, it is determined whether the color proportion of the color is within a preset color proportion range.

Specifically, in a case that the proportion of pixels having the same color as the color emitted by the second light source in the display region is larger than 40%, the color proportion of the color is considered within the preset color proportion range. It should be noted that embodiments of the present disclosure do not put any limitation on the preset color proportion range. Here, the description is made by taking the preset color proportion range of larger than 40% as an example. The preset color proportion range can be adjusted specifically according to actual situations. For example, the preset color proportion range can also be 30-80% or larger than 70%.

At step S18, if the color proportion is within the preset color proportion range, the brightness of the second light source is adjusted.

Specifically, in a case that the proportion of pixels having the same color as the color emitted by the second light source in the display region is larger than 40%, the voltage or current of the second light source can be adjusted so as to perform the color compensation for the display picture.

Figure 13:
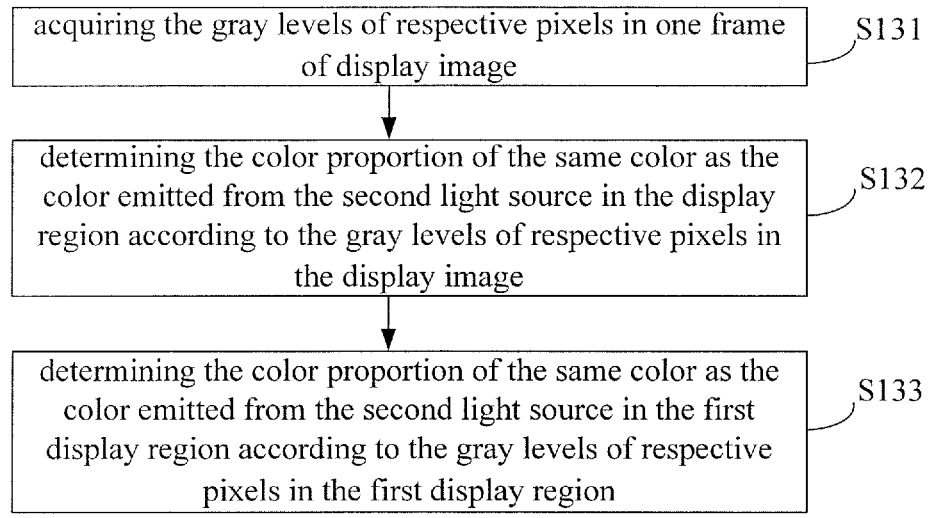
FIG. 13 is a schematic flow chart of step S13 in FIG. 11.

In the above step S13 of the display compensation method, acquiring the color proportion of the same color as the color emitted by the second light source in the display region specifically includes the following steps, as illustrated in FIG. 13.

At step S131, the gray levels of respective pixels in one frame of display image are acquired.

Specifically, each pixel includes three sub-pixels R (Red), G (Green), B (Blue), and sub-pixels of each color can show different brightness levels. The gray levels represent levels with different brightness ranged from the darkest level to the brightest level. Three sub-pixels R, G, B with different brightness are combined to form different colors. That is, the color variation of each pixel on the display screen is due to the gray level variation of R, G, B sub-pixels which constitute such a pixel. Thus, the gray level of each pixel can be represented by the RGB value of the pixel. Accordingly, it is needed to acquire the RGB values of respective pixels in one frame of display image.

At step S132, the color proportion of the same color as the color emitted by the second light source in the display region is determined according to the gray levels of respective pixels in the display image.

Specifically, the color proportion of the same color as the color emitted by the second light source in the display region can be determined according to the RGB values of respective pixels of the display region. For example, if the second light source is a red light source, then the proportion of red pixels in the display region is calculated. Specifically, the RGB value of a red pixel is (255, 0, 0) which is represented in hexadecimal as #FF0000. Accordingly, it is needed to calculate the proportion of pixels whose RGB value is (255, 0, 0), i.e. #FF0000, to all of pixels in the display region.

Optionally, the RGB values of respective pixels in the display region can also be transformed into an HSV color model in which HSV includes three parameters, i.e. H (Hue), S (Saturation), V (Value of brightness), and H values of respective pixel are solved so as to determine the color proportion of the same color as the color emitted by the second light source in the display region. For example, if the second light source is a red light source, then H value corresponding to red is 120°. The H values of respective pixels of the display region are solved according to the RGB values of respective pixels and the proportion of pixels with H of 120° to all of pixels in the display region is then determined.

Of course, the approach of determining the color proportion of the same color as the color emitted by the second light source in the display region according to the gray levels of respective pixels in the display region is not limited to the above two approaches, and the embodiments of the present disclosure put no limitation on this and the specific approach can be determined according to actual situations.

In addition, specific steps of acquiring the color proportion of the same color as the color emitted by the second light source in the display region in step S16 are the same as the above steps S131-S132, and are no longer described here in order to avoid redundancy.

Optionally, the first light source can be a side-type light source which is advantageous to reduce the thickness of the backlight board, and the second light source can be a direct-type light source which is advantageous to perform the color compensation for the display picture.

Optionally, the display panel includes multiple second display regions, the backlight module includes multiple second backlight regions corresponding to the second display regions, and steps S13-S15 of the display compensation method are specifically as follows.

At step S13, acquiring the color proportion of the same color as the color emitted by the second light source in the display region under the condition that the first light source is turned on specifically includes acquiring the color proportion of the same color as the color emitted by the second light source in the second display region under the condition that the first light source is turned on.

At step S14, it is determined whether the color proportion of the color is within a preset color proportion range.

At step S15, turning on the second light source in a case in which the color proportion is within the preset color proportion range specifically includes turning on the second light source for the second backlight region of the backlight module corresponding to the second display region in a case in which the color proportion is within the preset color proportion range.

In the above method, the compensation can be performed for the second display region by the second light source of the second backlight region, that is, the partition compensation is performed for the display region, and thus a more accurate compensation is realized and the quality of display picture is further improved.

In the following, an embodiment of the present disclosure provides a display compensation apparatus corresponding to the above display compensation method. It should be noted that respective units included in the apparatus below can execute the corresponding steps in the above method, thus the respective units of the apparatus are not described in detail in the following embodiments.

Figure 14:
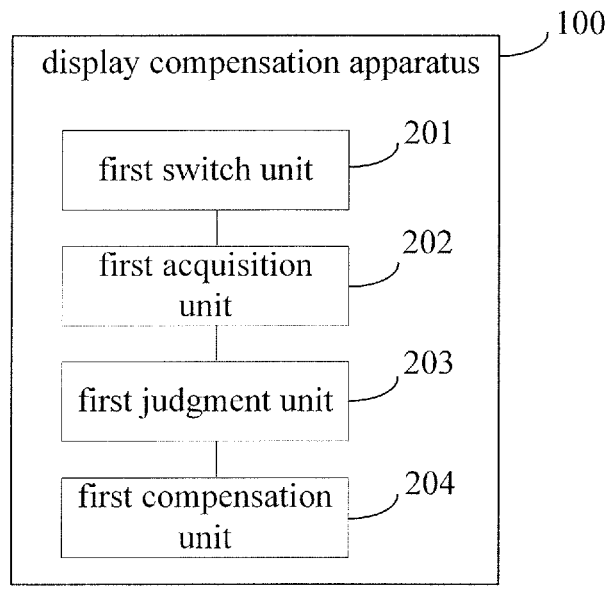
FIG. 14 is a schematic diagram of a display compensation apparatus, which is applied to a display device, provided by an embodiment of the present disclosure.

The embodiment of the present disclosure provides a display compensation apparatus applied to a display device including a display panel and a backlight module. The display panel includes a display region, the backlight module includes a first light source and a second light source, and the second light source is a monochromatic light source. As illustrated in FIG. 14, the display compensation apparatus 100 includes the following units.

A first switch unit 201 is used for turning on the first light source.

Specifically, the first light source is turned on by the first switch unit 201 to provide the display panel with a backlight. The first light source can be a LED lamp or can be other light-emitting elements. In addition, the first light source can be a monochromatic light source emitting only a single color, for example, a red light source, a green light source, a yellow light source, etc, or can be a light source formed by mixing the lights emitted by light sources with different colors, for example, a white light source, and is not limited in particular herein.

A first acquisition unit 202 is used for acquiring the color proportion of the same color as the color emitted by the second light source in the display region under a condition that the first light source is turned on.

Specifically, the first acquisition unit 202 can acquire the gray levels of respective pixels in the display region so as to determine the color proportion of the same color as the color emitted by the second light source in the display region.

A first judgment unit 203 is used for judging whether the color proportion of the color is within a preset color proportion range.

Specifically, the first judgment unit 203 judges whether the proportion of pixels having the same color as the color emitted by the second light source in the display region is larger than 40%, so as to determine the color proportion of the color is within the preset color proportion range. It should be noted that embodiments of the present disclosure do not put any limitation on the preset color proportion range. Here, the description is made by taking the preset color proportion range of larger than 40% as an example. The preset color proportion range can be adjusted specifically according to actual situations. For example, the preset color proportion range can also be 30-80% or larger than 70%.

A first compensation unit 204 is used for turning on the second light source if the color proportion is within the preset color proportion range so as to perform the color compensation for the display picture.

Specifically, in a case that the proportion of pixels having the same color as the color emitted by the second light source in the display region is larger than 40%, the second light source can be turned on by the first compensation unit 204 to perform the color compensation for the display picture. The second light source can be a laser lamp or can be other light-emitting elements capable of emitting light, and there is no limitation on this. It needs that the light emitted by the second light source is monochromatic.

The embodiment of the present disclosure provides a display compensation apparatus applied to a display device. In the apparatus, the first acquisition unit acquires the color proportion of the same color as the color emitted by the second light source in the display region under a condition that the first light source is turned on, the first judgment unit performs the judgment on the color proportion, the first compensation unit turns on the second light source if the color proportion is within the preset color proportion range, and the second light source performs the color compensation for the display picture, rendering the color more vivid when the display device is in display.

Figure 15:
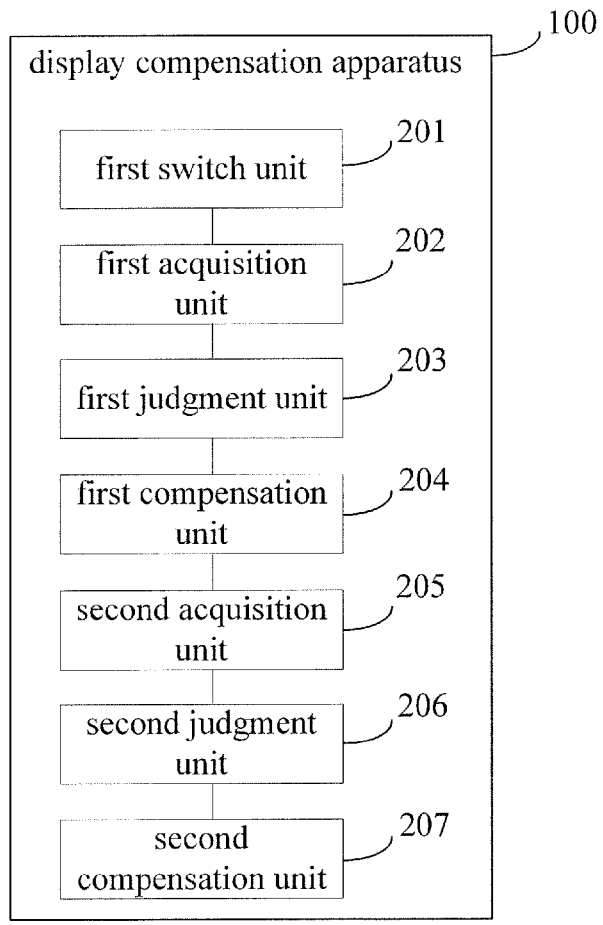
FIG. 15 is a schematic diagram of another display compensation apparatus, which is applied to a display device, provided by an embodiment of the present disclosure.

Further, after the second light source is turned on to perform the color compensation for the display panel for one time, in order to judge the effect of the color compensation and determine whether it needs to compensate for the display picture again, as illustrated in FIG. 15, the display compensation apparatus 100 further includes the following units.

A second acquisition unit 205 is used for acquiring the color proportion of the same color as the color emitted by the second light source in the display region under a condition that the first light source and the second light source are turned on.

Specifically, the second acquisition unit 205 can acquire the gray levels of respective pixels of the display region so as to determine the color proportion of the same color as the color emitted by second light source in the display region.

A second judgment unit 206 is used for judging whether the color proportion of the color is within a preset color proportion range.

Specifically, the second judgment unit 206 judges whether the proportion of pixels having the same color as the color emitted by the second light source in the display region is larger than 40%, so as to determine the color proportion of the color is within the preset color proportion range. It should be noted that embodiments of the present disclosure do not put any limitation on the preset color proportion range. Here, the description is made by taking the preset color proportion range of larger than 40% as an example. The preset color proportion range can be adjusted specifically according to actual situations. For example, the preset color proportion range can also be 30-80% or larger than 70%.

A second compensation unit 207 is used for adjusting the brightness of the second light source if the color proportion is within the preset color proportion range.

Specifically, in a case that the proportion of pixels having the same color as the color emitted by the second light source in the display region is larger than 40%, the voltage or current of the second light source can be adjusted by the second compensation unit 207 so as to perform the color compensation for the display picture.

Figure 16:
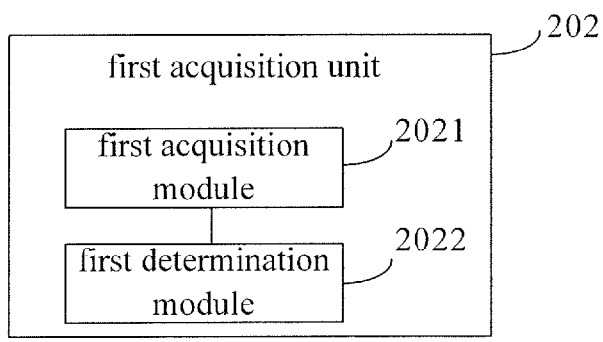
FIG. 16 is a schematic diagram of the first acquisition unit in FIG. 14.

Optionally, as illustrated in FIG. 16, the first acquisition unit 202 specifically includes the following modules.

A first acquisition module 2021 is used for acquiring the gray levels of respective pixels in one frame of display image.

Specifically, each pixel includes three sub-pixels R (Red), G (Green), B (Blue), and sub-pixels of each color can show different brightness levels. The gray levels represent the levels of different brightness ranged from the darkest level to the brightest level. Three sub-pixels R, G, B with different brightness are combined to form different colors. That is, the color variation of each pixel on the display screen is due to the gray level variation of R, G, B sub-pixels which constitute such a pixel. Thus, the gray level of each pixel can be represented by the RGB values of the pixel. Accordingly, the first acquisition module 2021 acquires the RGB values of respective pixels in one frame of display image.

A first determination module 2022 is used for determining the color proportion of the same color as the color emitted by the second light source in the display panel according to the gray levels of respective pixels in the display image.

Specifically, the color proportion of the same color as the color emitted by the second light source in the display region can be determined by the first determination module 2022 according to the RGB values of respective pixels of the display region. For example, if the second light source is a red light source, then the proportion of red pixels in the display region is calculated. Specifically, the RGB value of a red pixel is (255, 0, 0) which is represented in hexadecimal as #FF0000. Accordingly, it is needed to calculate the proportion of pixels whose RGB value is (255, 0, 0), i.e. #FF0000, in all of pixels in the display region.

Optionally, the first determination module 2022 can also transform the RGB values of respective pixels in the display region into an HSV color model in which HSV includes three parameters, i.e. H (Hue), S (Saturation), V (Value of brightness), and solve H values of respective pixels so as to determine the color proportion of the same color as the color emitted by the second light source in the display region. For example, if the second light source is a red light source, then the H value corresponding to red is 120°. The respective H values of respective pixels of the display region are solved according to the RGB values of respective pixels in the display area and the proportion of pixels with H of 120° in all of pixels in the display region is then determined.

Of course, the approach of determining the color proportion of the same color as the color emitted by the second light source in the display region according to the gray levels of respective pixels in the display region is not limited to the above two approaches. The embodiments of the present disclosure put no limitation on this and the specific approach can be determined according to actual situations.

In addition, the second acquisition unit can also include a second acquisition module and a second determination module, which are no longer described here in order for avoid redundancy.

Optionally, the first light source can be a side-type light source which is advantageous to reduce the thickness of the backlight board, and the second light source can be a direct-type light source which is advantageous to perform the color compensation for the display picture.

Optionally, the display panel includes multiple second display regions, and the backlight module includes multiple second backlight regions corresponding to the second display regions respectively.

The first acquisition unit is specifically used for acquiring the color proportion of the same color as the color emitted by the second light source in the second display region under the condition that the first light source is turned on.

The first compensation unit is specifically used for turning on the second light source for the second backlight region of the backlight module corresponding to the second display region if the color proportion is within the preset color proportion range.

In the above apparatus, the compensation is performed for the second display sub-regions by the first compensation unit, that is, the partition compensation is performed for the display region, and thus a more accurate compensation is realized and the quality of display picture is further improved.

An embodiment of the present disclosure provides a display device including the display compensation apparatus according to the above description. When the display device displays a 3D picture, the color is more vivid and the display effect is improved.

The above-described is only specific implementations of the present disclosure, however, the protection scope of the present disclosure is not limited thereto. Within the technical range disclosed by the present disclosure, those skilled in the art can easily come up with changes or substitutions, which should all be covered within the protection scope of the present disclosure. Thus, the protection scope of the present disclosure shall be based on the protection scope of the attached claims.

The present application claims the priority of Chinese Patent Application No. 201510082424.1 filed on Feb. 15, 2015, the entire content of which is incorporated as part of the present application by reference.

What is claimed is:

1. A display compensation method applied to a shutter 3D display device comprising a display panel and a backlight module, wherein the backlight module comprises a first light source and a second light source, the display panel comprises a plurality of first display regions, the backlight module comprises a plurality of first backlight regions corresponding to the plurality of first display regions respectively, and the plurality of first backlight regions of the backlight module are turned on in sequence; the display compensation method comprises:
   turning on the first light source of the first backlight region;
   acquiring a brightness generated by the backlight module under a condition that the first light source is turned on;
   determining whether the brightness is within a preset brightness range;
   turning on the second light source of the first backlight region when the brightness is within the preset brightness range, so as to perform a display brightness compensation for a displaying picture;
   acquiring the brightness generated by the backlight module under a condition that the first light source and the second light source are turned on;
   determining whether the brightness is within the preset brightness range;
   adjusting the brightness of the second light source when the brightness is within the preset brightness range.

2. The display compensation method according to claim 1, wherein the second light source is a monochromatic light source, and the method further comprises:
   acquiring a color proportion of a same color as the color emitted by the second light source in the first display region corresponding to the first backlight region;
   determining whether the color proportion of the color is within a preset color proportion range;
   in a case in which the color proportion is within the preset color proportion range,
   when the second light source of the first backlight region is not turned on, turning on the second light source so as to perform a color compensation for the displaying picture; or
   when the second light source of the first backlight region has been turned on, adjusting the brightness of the second light source so as to perform the color compensation for the displaying picture.

3. The display compensation method according to claim 2, wherein said acquiring the color proportion of the same color as the color emitted by the second light source in the first display region corresponding to the first backlight region comprises:
   acquiring gray levels of respective pixels in one frame of display image;
   determining the gray levels of respective pixels of the first display region corresponding to the first backlight region;
   determining the color proportion of the same color as the color emitted by the second light source in the first display region according to the gray levels of respective pixels of the first display region.

4. The display compensation method according to claim 2, wherein the first display region comprises a plurality of first display sub-regions, and the backlight module comprises a plurality of first backlight sub-regions corresponding to the plurality of first display sub-regions respectively;
   wherein the color proportion of the same color as the color emitted by the second light source in the first display sub-region corresponding to the first backlight sub-region is acquired;
   when the second light source of the first backlight sub-region is not turned on, the second light source is turned on; or
   when the second light source of the first backlight sub-region has been turned on, the brightness of the second light source is adjusted.

5. The display compensation method according to claim 1, wherein the second light source is a monochromatic light source.

6. The display compensation method according to claim 1, wherein the first light source is a LED light source and the second light source is a laser light source.

7. A display compensation method applied to a display device comprising a display panel and a backlight module, wherein the display panel comprises a display region, the backlight module comprises a first light source and a second light source, and the second light source is a monochromatic light source; the display compensation method comprises:
   turning on the first light source;
   acquiring a color proportion of a same color as the color emitted by the second light source in the display region under a condition that the first light source is turned on;
   determining whether the color proportion of the color is within a preset color proportion range;
   turning on the second light source when the color proportion is within the preset color proportion range, so as to perform a color compensation for a displaying picture;
   acquiring the color proportion of the same color as the color emitted by the second light source in the display region under a condition that the first light source and the second light source are turned on;
   determining whether the color proportion of the color is within a preset color proportion range;
   adjusting a brightness of the second light source when the color proportion is within the preset color proportion range.

8. The display compensation method according to claim 7, wherein said acquiring the color proportion of the same color as the color emitted by the second light source in the display region comprises:
   acquiring gray levels of respective pixels in one frame of display image;
   determining the color proportion of the same color as the color emitted by the second light source in the display region according to the gray levels of respective pixels in the display image.

9. The display compensation method according to claim 7, wherein the display panel comprises a plurality of second display regions, and the backlight module comprises a plurality of second backlight regions corresponding to the plurality of second display regions respectively;
   said acquiring the color proportion of the same color as the color emitted by the second light source in the display region under the condition that the first light source is turned on comprises: acquiring the color proportion of the same color as the color emitted by the second light source in the second display region under the condition that the first light source is turned on;
   wherein when the color proportion is within the preset color proportion range, the second light source for the second backlight region of the backlight module corresponding to the second display region is turned on.

10. The display compensation method according to claim 7, wherein the first light source is a LED light source and the second light source is a laser light source.

11. A display compensation apparatus adopting the display compensation method of claim 1, the display compensation apparatus comprising:
   a first switch unit configured to turn on the first light source of the first backlight region;
   a first acquisition unit configured to acquire a brightness generated by the backlight module under a condition that the first light source is turned on;
   a first judgment unit configured to judge whether the brightness is within a preset brightness range;
   a first compensation unit configured to turn on the second light source of the first backlight region when the brightness is within the preset brightness range so as to perform a display brightness compensation for a displaying picture;
   a second acquisition unit configured to acquire the brightness generated by the backlight module under a condition that the first light source and the second light source are turned on;
   a second judgment unit configured to judge whether the brightness is within the preset brightness range;
   a second compensation unit configured to adjust the brightness of the second light source when the brightness is within the preset brightness range.

12. The display compensation apparatus according to claim 11, wherein the second light source is a monochromatic light source, and the display compensation apparatus further comprises:
   a third acquisition unit configured to acquire the color proportion of the same color as the color emitted by the second light source in the first display region corresponding to the first backlight region;
   a third judgment unit configured to judge whether the color proportion of the color is within a preset color proportion range;
   a third compensation unit configured to, in a case in which the color proportion is within the preset color proportion range,
   turn on the second light source of the first backlight region so as to perform a color compensation for the displaying picture when the second light source is not turned on; or
   adjusting the brightness of the second light source of the first backlight region so as to perform the color compensation for the display picture when the second light source has been turned on.

13. The display compensation apparatus according to claim 12, wherein said third acquisition unit comprises:
   a first acquisition module configured to acquire gray levels of respective pixels in one frame of display image;
   a first judgment module configured to determine gray levels of respective pixels of the first display region corresponding to the first backlight region;
   a first determination module configured to determine the color proportion of the same color as the color emitted by the second light source in the first display region according to the gray levels of respective pixels of the first display region.

14. A display compensation apparatus adopting the display compensation method of claim 7, the display compensation apparatus comprising:
   a first switch unit configured to turn on the first light source;
   a first acquisition unit configured to acquire the color proportion of the same color as the color emitted by the second light source in the display region under a condition that the first light source is turned on;
   a first judgment unit configured to judge whether the color proportion of the color is within a preset color proportion range;
   a first compensation unit configured to turn on the second light source when the color proportion is within the preset color proportion range so as to perform the color compensation for the displaying picture;
   a second acquisition unit configured to acquire the color proportion of the same color as the color emitted by the second light source in the display region under a condition that the first light source and the second light source are turned on;
   a second judgment unit configured to judge whether the color proportion of the color is within a preset color proportion range;
   a second compensation unit configured to adjust a brightness of the second light source when the color proportion is within the preset color proportion range.

15. A display device comprising the display compensation apparatus according to claim 11.

16. A display device comprising the display compensation apparatus according to claim 14.

* * * * *